United States Patent [19]

Hulsing, II

[11] Patent Number: 5,168,756
[45] Date of Patent: Dec. 8, 1992

[54] DITHERING CORIOLIS RATE AND ACCELERATION SENSOR UTILIZING A PERMANENT MAGNET

[75] Inventor: Rand H. Hulsing, II, Redmond, Wash.

[73] Assignee: Sundstrand Corporation, Rockford, Ill.

[21] Appl. No.: 653,535

[22] Filed: Feb. 8, 1991

[51] Int. Cl.⁵ .............................................. G01P 9/04
[52] U.S. Cl. ........................................ 73/505; 73/510
[58] Field of Search ................. 73/505, 510, 511, 520, 73/519

[56] References Cited

U.S. PATENT DOCUMENTS

| | | |
|---|---|---|
| 4,372,173 | 2/1983 | EerNisse et al. |
| 4,445,376 | 5/1984 | Merhav |
| 4,467,651 | 8/1984 | Melametz et al. |
| 4,510,802 | 4/1985 | Peters .................. 73/505 |
| 4,512,192 | 4/1985 | Peters |
| 4,517,841 | 5/1985 | Malametz et al. |
| 4,522,062 | 6/1985 | Peters |
| 4,538,461 | 9/1985 | Juptner et al. |
| 4,541,105 | 9/1985 | Lee et al. |
| 4,590,801 | 5/1986 | Merhav |
| 4,592,233 | 6/1986 | Peters |
| 4,628,735 | 12/1986 | Kirkpatrick |
| 4,654,663 | 3/1987 | Alsenz et al. |
| 4,665,748 | 5/1987 | Peters |
| 4,706,259 | 11/1987 | Tonn et al. |
| 4,711,128 | 12/1987 | Boura |
| 4,712,426 | 12/1987 | Peters |
| 4,712,427 | 12/1987 | Peters |
| 4,727,752 | 3/1988 | Peters |
| 4,750,363 | 6/1988 | Norling |
| 4,754,644 | 7/1988 | Valentine |
| 4,766,768 | 8/1988 | Norling |

(List continued on next page.)

OTHER PUBLICATIONS

Albert P. Pisano, "Resonant-Structure Micromotors," Micro Electro Mechanical Systems, Feb. 20-22, 1989, IEEE Catalog No. 89TH0249-3.

'William C. Tang, et al., "Laterally Driven Polysilicon Resonant Microstructures," Micro Electro Mechanical Systems, Feb. 20-22, 1989, IEEE Catalog No. 89TH0249-3.

Primary Examiner—Hezron E. Williams
Assistant Examiner—Howard Wisnia
Attorney, Agent, or Firm—McAndrews, Held & Malloy, Ltd.

[57] ABSTRACT

A sensor (10) for measuring angular rate and linear acceleration of a body, in which first and second rotors (30, 31), each carrying a plurality of accelerometers (44, 49), are mounted for counter-rotating dithering motion on opposite sides of a base plate (11). A single permanent magnet (70) is mounted centrally of the base plate, with one pole (71) disposed adjacent the first rotor and the other pole (72) disposed adjacent the second rotor. First and second X-shaped pole pieces (80, 81) are mounted at the respective opposite poles of the magnet, and a plurality of velocity sensing pick-off coils (86) are mounted on the arms (82, 83, 84 and 85) of the pole pieces for cooperation with flux splitting protrusions (34, 35 and 36) on the rotors. The arms of the pole pieces are associated with the flux splitting protrusions so that differential flux splitting is obtained as the rotors are rotated in opposite directions. The accelerometers are arranged in opposed pairs on the respective rotors so that their sensitive axes are parallel to one another but point in opposite directions for canceling common mode error signals, and they are carried on rotor arms (40, 41, 42 and 45, 46 and 47) that converge toward one another from opposite sides of the base plate, so that the accelerometer centers of percussion are spaced closely together and at the same dither radius to minimize cross-axis error signals. A differential torque dither drive for the rotors comprises a plurality of electromagnet coils (19, 20) carried by the base plate for cooperation with armatures (37, 38 and 39) on the rotors to simultaneously rotate the rotors in opposite directions, and a sinusoidally varying energizing current effects opposite or reverse operation.

19 Claims, 5 Drawing Sheets

U.S. PATENT DOCUMENTS

| | | | |
|---|---|---|---|
| 4,782,700 | 11/1988 | Hulsing | 73/505 |
| 4,786,861 | 11/1988 | Hulsing . | |
| 4,799,385 | 1/1989 | Hulsing et al. . | |
| 4,810,922 | 3/1989 | Hirsch . | |
| 4,811,602 | 3/1989 | Hulsing | 73/505 |
| 4,814,680 | 3/1989 | Hulsing | 73/517 AV |
| 4,821,572 | 4/1989 | Hulsing | 73/505 |
| 4,841,773 | 6/1989 | Stewart . | |
| 4,848,156 | 7/1989 | Hulsing | 73/505 |
| 4,864,861 | 9/1989 | Hulsing | 73/517 AV |
| 4,870,588 | 9/1989 | Merhav . | |
| 4,872,342 | 10/1989 | Hanson et al. . | |
| 4,872,343 | 10/1989 | Peters . | |
| 4,879,914 | 11/1989 | Norling . | |
| 4,881,408 | 11/1989 | Hulsing et al. . | |
| 4,882,933 | 11/1989 | Petersen et al. . | |
| 4,891,982 | 1/1990 | Norling . | |
| 4,891,984 | 1/1990 | Fujii et al. . | |
| 4,896,268 | 1/1990 | MacGugan | 73/505 |
| 4,901,586 | 2/1990 | Blake . | |
| 4,912,990 | 4/1990 | Norling . | |
| 4,920,801 | 5/1990 | Church . | |
| 4,922,756 | 5/1990 | Henrion . | |
| 4,928,203 | 5/1990 | Swindal et al. . | |
| 4,930,351 | 6/1990 | Macy et al. . | |
| 4,968,909 | 11/1990 | Hulsing II . | |
| 4,996,877 | 3/1991 | Stewart et al. | 73/505 |
| 5,065,627 | 11/1991 | Stewart et al. . | |
| 5,070,263 | 12/1991 | Hulsing II . | |

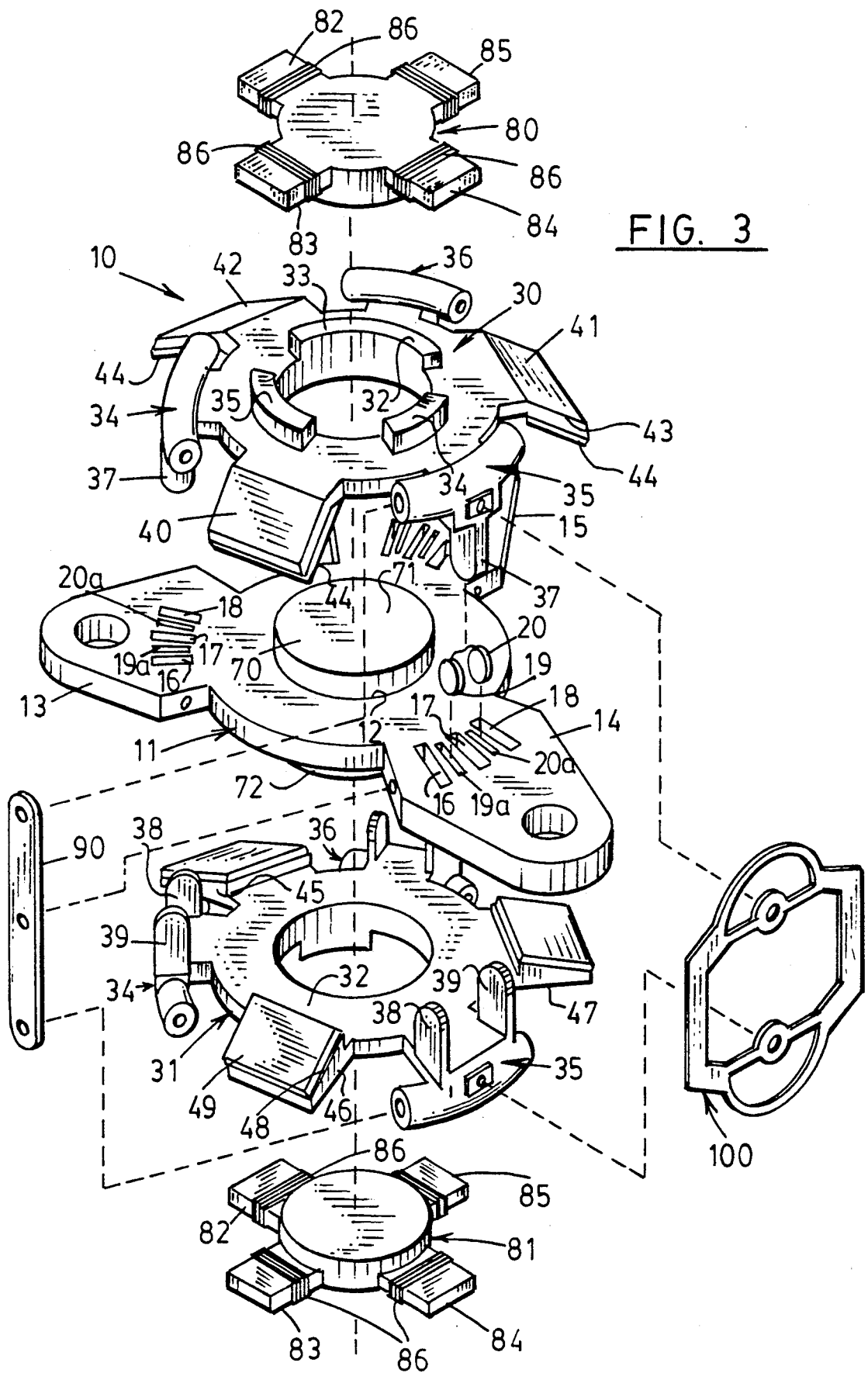

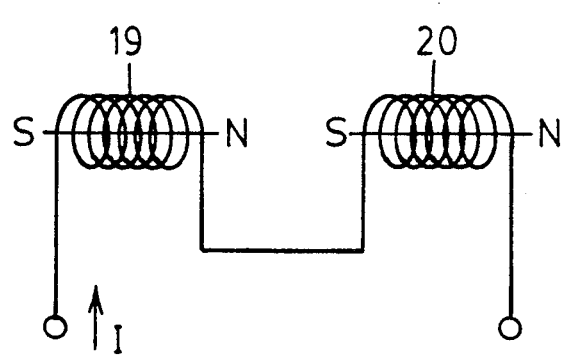
FIG. 6
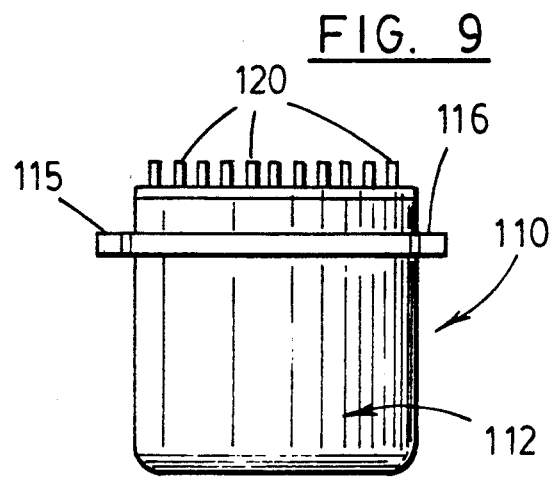
FIG. 9
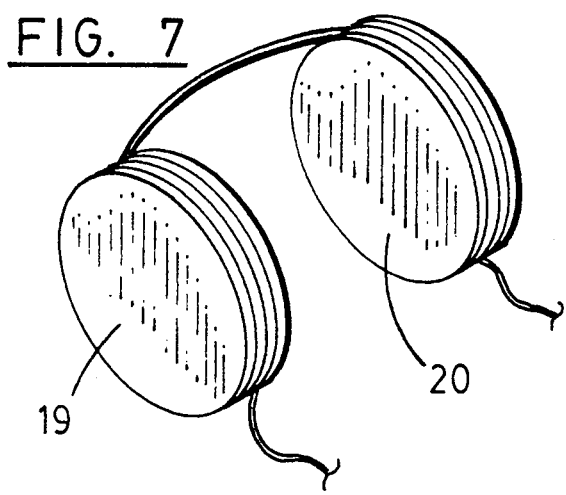
FIG. 7
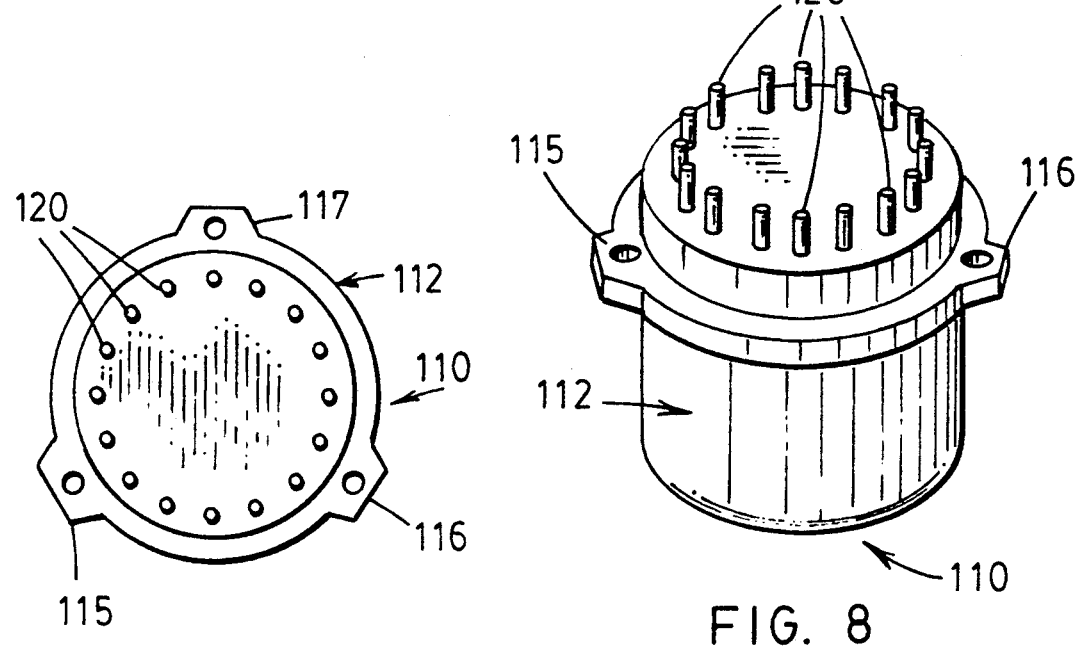
FIG. 10
FIG. 8

5,168,756

DITHERING CORIOLIS RATE AND ACCELERATION SENSOR UTILIZING A PERMANENT MAGNET

FIELD OF THE INVENTION

This invention relates to sensing devices, and in particular, to an apparatus for sensing linear acceleration and angular rotation of a body.

BACKGROUND OF THE INVENTION

Movement of a body in a straight line while in a rotating frame of reference produces a perpendicular force known as a Coriolis force. This phenomenon can be utilized in inertial sensing by obtaining a signal that is a measure of the Coriolis acceleration. In applications such as inertial navigation, for instance, linear accelerometers can be used to sense the Coriolis acceleration. Conventional high performance inertia measurement units have typically been expensive, complex clusters of three gyroscopes and three accelerometers. More recently, the advent of low cost, high volume micromachined accelerometers has made it cost effective to use only accelerometers to perform the entire inertial sensing function. These accelerometers are preferably vibrated or dithered in the rotating frame of reference, which produces the sensor-induced Coriolis force, and thereby produces the sensitivity of the device to rotation. If the dither amplitude and frequency are held constant, the Coriolis acceleration is proportional to rotation rate, which can therefore be directly measured by the accelerometers.

The above-described principle can be used to measure the angular rate and linear acceleration with respect to three orthogonal prime axes X, Y and Z of a body by providing an accelerometer in association with each of the axes. Thus, periodic or dithered movement of an accelerometer along the Y axis of the body, with the sensitive axis of the accelerometer aligned with the Z axis, results in the accelerometer experiencing a Coriolis acceleration directed along the Z axis as the body rotates about the X axis. This acceleration or force is proportional to a change in velocity of the body along the Y axis and its angular rate of rotation about the X axis. An output signal from the accelerometer thus includes a force signal representing the linear acceleration of the body along the Z axis, and a periodic component or rotational signal representing the Coriolis acceleration resulting from rotation of the body about the X axis. Normally, the amplitude of the Coriolis force signal would be very small in relation to the linear acceleration signal, but dithering the accelerometers at a specific frequency helps to detect the Coriolis force signal.

When using dithered accelerometers to detect Coriolis force for thereby measuring the rate of rotation of a body, it is essential to separate the dither frequency signal from other sources of acceleration. With a linear accelerometer, a large body acceleration can be summed with a small Coriolis dither signal. If accelerometers are paired in opposed relationship to one another, the linear acceleration can be separated from the angular rotation induced acceleration by sum and difference techniques in a signal processor. In addition, such pairing of accelerometers enables the signal processing to eliminate spurious signals, since each accelerometer in the pair will produce an equal but opposite signal for any extraneous forces on the accelerometers, such as vehicle vibration and the like.

The foregoing principles have been incorporated in several prior art inertial sensing devices, including those described in commonly owned U.S. Pat. Nos. 4,510,802, 4,590,801 and 4,821,572. Reference can be made to those patents for a detailed explanation of the theory of operation using dithered accelerometers to measure angular rate and linear acceleration. These patents variously disclose methods and apparatus for mounting and dithering accelerometers and for the processing of the output signals from the accelerometers to obtain angular rate and linear acceleration measurements of a moving body on which the accelerometers are mounted.

U.S. Pat. No. 4,821,572, for example, discloses an arrangement in which pairs of opposed accelerometers are mounted in a triaxial configuration for detecting and measuring linear acceleration and angular rate of motion about a plurality of prime axes. In this arrangement, a matched pair of accelerometers is associated with each of the prime axes, with one accelerometer of each pair mounted on a first rotating frame member and the other accelerometer of the pair mounted on a second, counter-rotating frame member. The acceleration sensitive axes of the two accelerometers comprising a pair are perpendicular to the direction of dither movement and parallel with a respective prime axis. They are also parallel to one another but point in opposite directions. Accordingly, each accelerometer produces an output signal that is a function of the Coriolis acceleration. Signal processing means connected with the accelerometers are operative to determine the angular rate of rotation and linear acceleration with respect to the associated prime axis. Since the accelerometers of each pair are disposed in back-to-back or opposed relationship to one another, equal but opposite signals are produced by the two accelerometers. This matching of pairs of opposed, dithered accelerometers, in conjunction with the unique signal processing, enables common mode error signals to be rejected while at the same time increasing the sensitivity of the sensor to the motions being measured, as more fully explained in the referenced patents.

The preferred arrangement of the accelerometers in U.S. Pat. No. 4,821,572 is depicted in FIGS. 12 and 13. As shown, the housing on which the accelerometers are mounted has a dither axis 40 about which the frames and their associated accelerometers are oscillated, and the sensitive axes of the accelerometers are disposed at an acute angle of 35.26° with respect to this axis. The centers of percussion of the accelerometers in this structure are spaced apart from one another by a distance "$d_1$", and when the accelerometers are dithered about the axis 40, their output signal will include an error component proportional to this distance and to the angular acceleration of the accelerometers about an axis perpendicular to both the rate sensitive axis and the acceleration sensitive axis. This distance could be reduced by mounting the accelerometers closer to each other.

But, moving the accelerometers closer together is prevented by the multiple electromagnets 42 and associated hardware which are used in the structure of U.S. Pat. No. 4,821,572 to provide the magnetic force for obtaining the dither motion, and to establish the flux field that cooperates with pick-off coils 66 to sense the dither motion. A variety of mounting hardware and separately attached pole pieces, with concomitant assembly steps are required in this structure.

There is, therefore, need for an angular rate and linear acceleration sensor that overcomes the above deficiencies in the prior art by providing a structure that is simple and compact, economical in construction, and which provides increased sensitivity while at the same time reducing error signals due to misalignment, cross-axis motion and the like.

SUMMARY OF THE INVENTION

The present invention provides an angular rate and linear acceleration sensor that is simple and compact in construction, and which uses fewer parts than conventional devices, thereby reducing the cost and minimizing inaccuracies due to assembly errors and misalignment, cross-axis error signals, and the like.

The sensing device of the invention has a plurality of accelerometers arranged in opposed relationship to one another in matched pairs on dithered, counter-rotating rotors mounted on opposite sides of a stationary base plate. The accelerometers are arranged so that the distance between the centers of percussion of the accelerometers in each pair is minimized, thereby reducing the cross axis error signal. A single permanent magnet is carried by the base plate, and an X-shaped pole piece is mounted at each of the poles of the magnet. Velocity sensing pick-off coils are carried by the pole, pieces for cooperation with flux splitting raised portions on the rotors so that differential sensing of the rotor angular velocity is obtained as the rotors counter-rotate about the dither axis. The velocity sensing coils are arranged to work in series opposing pairs across the pole pieces to produce an analog voltage proportional to the angular velocity about the dither axis.

The counter-rotating rotors and accelerometers mounted thereon are caused to dither by a simple DC motor comprising stationary, electromagnetic dither drive or torque coils mounted on the base plate and cooperating with armatures on the rotors.

The single permanent magnet provides flux for the accelerometers, the pick-off coils and the dither drive coils.

The resulting sensor is a compact, high performance and inexpensive inertial measurement unit that combines six low profile linear accelerometers, a low-cost DC torque motor, and a low-cost angular velocity sensor in a miniature mechanism that provides a digital output for three axes of rotation and three axes of linear acceleration, which can be compensated for temperature.

More specifically, the sensor of the invention includes first and second rotors of magnetic material mounted on opposite sides of a stationary base plate made of nonmagnetic material, for counter-rotating oscillation about a dither axis coincident with the longitudinal center axis of the base plate and rotors. In one form of the invention the base plate includes structure for mounting the sensor to a body whose motion is to be measured, and also dissipates heat generated by the electromagnet dither drive coils. Each rotor carries a plurality of low profile linear accelerometers spaced equidistantly around the circumference of the rotor, with the accelerometers on one rotor positioned in adjacent, opposed relationship to the accelerometers on the other rotor and each comprising one half of an accelerometer pair. The accelerometers are mounted with their sensitive axes perpendicular to the direction of dither motion and perpendicular, respectively, with three orthogonal prime axes with respect to which angular rate is to be measured. Any low profile accelerometer design may be used, including vibrating beam accelerometers as described in applicant's previous patents. Micromachined accelerometers made from a silicon wafer are particularly well suited for the present invention, especially from the viewpoint of miniaturi-zation and accuracy.

The permanent magnet is supported in the center of the base plate at the dither axis, with one pole of the magnet above, or on one side of the base plate and the other pole below, or on the other side of the base plate. The stationary X-shaped pole pieces of magnetic material are positioned at opposite ends or poles of the magnet, and each pole piece has four arms extending radially outwardly over the rotors, with the arms of one pole piece in vertically aligned, parallel relationship with the arms of the other pole piece. A velocity sensing pick-off coil is disposed on each arm.

The total magnetic flux provided by the magnet is split into four equal parts by the upper X-shaped pole piece, and is recombined in the rotor. The flux again splits roughly two-to-one between the drive coils and accelerometer paths, and is then recombined in the lower rotor. It is again split into four roughly equal parts by the lower X-shaped pole piece and then returned to the magnet.

The flux splitting protrusions of the rotors extend into proximity with the arms of the pole pieces, and as the rotors rotate about the dither axis, they cut more or less lines of flux, depending upon their position relative to the arms and coils carried thereon. In this connection, lines of flux extend from one pole of the magnet through the adjacent pole piece, outwardly through its arms and thence into the protrusions of the rotor, through the rotor and accelerometer pair and into the opposing rotor and its associated pole piece, and back to the opposite bole of the magnet. Any scale factor modulation of the torque coils to the velocity sensing coils is minimized by the use of four flux splitting arms on each rotor arranged in series opposing pairs for producing differential flux splitting. Together, all eight coils (four on each pole piece) are in series to produce an analog voltage proportional to the angular velocity about the dither axis.

The dither drive or torque coils are carried in pairs by the base plate to develop opposed north and south poles and are connected to a source of periodic electric current so that the coils are cyclically energized. The rotors have armatures disposed in operative association with the dither drive or torque coils of each pair, and as the coils in the pairs are energized, the armatures of the first and second rotors are alternately pulled in opposite directions to impart an oscillatory dithering motion to the rotors.

The rotors are secured to each other and to the base plate by flexures that limit movement of the rotors to the oscillatory dithering motion described above. The flexures provide a natural frequency that is near the drive frequency, and also define the space or gaps between the pole pieces and rotors and between the rotors and torque coils.

Flexible links are also connected between the rotors to limit motion of the rotors to the oscillatory movement described above, and to cause the rotors to have equal and opposite motions relative to one another. This ensures that any extraneous movement of one rotor will be imparted in equal but opposite direction to the other rotor. Since the accelerometers are disposed in opposite directions on the respective rotors, they will sense this movement and produce signals effectively canceling any spurious signals that might otherwise be caused by the extraneous movement.

BRIEF DESCRIPTION OF THE DRAWINGS

These and other objects and advantages of the invention will become apparent from the following detailed description when considered with the accompanying drawings, wherein like reference characters designate like parts throughout the several views, and wherein:

FIG. 3 is an enlarged, exploded perspective view of the first form of the invention;

FIG. 6 is a schematic diagram of one pair of torque coils used to dither the rotors in the sensor of FIG. 1;

FIG. 7 is a perspective view of one of the torque coil pairs used to effect the dithering motion of the rotors;

FIG. 8 is a top perspective view of a second form of inertial sensor according to the invention, wherein a dust cover is provided to prevent foreign matter from fouling the magnetic gaps;

FIG. 9 is a side view in elevation of the sensor of FIG. 8;

FIG. 10 is a top plan view of the sensor of FIG. 8;

DETAILED DESCRIPTION OF THE PREFERRED EMBODIMENTS

Figure 1:
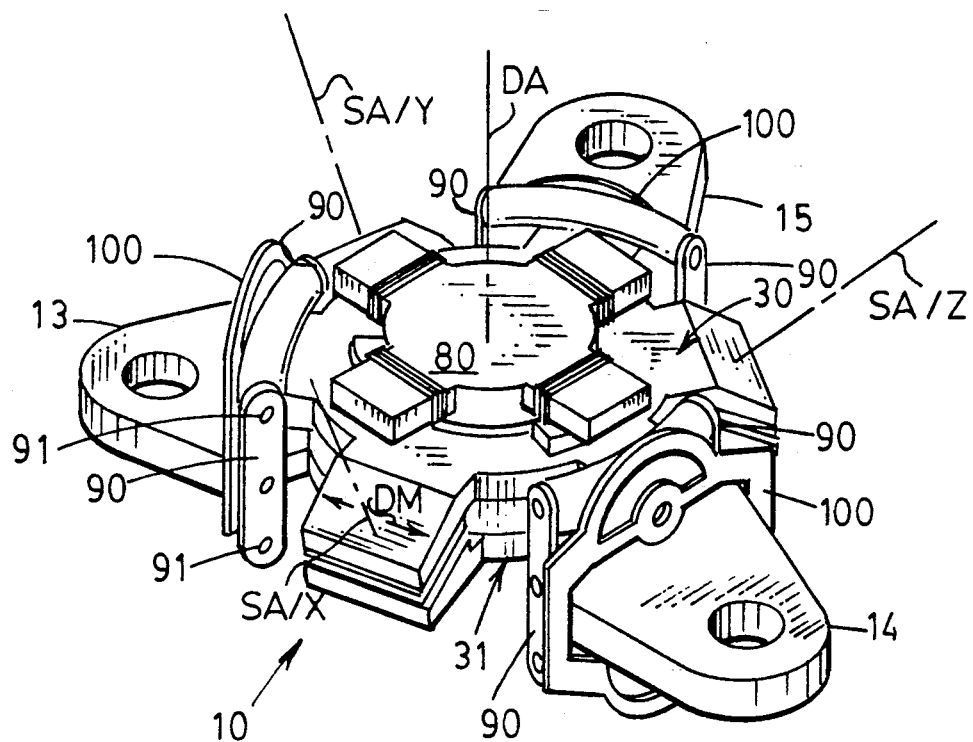
FIG. 1 is a top perspective view of a first form of sensor according to the invention, in which the sensor is mounted by means of the base plate.

Referring more specifically to the drawings, a first form of inertial sensor in accordance with the invention is represented generally at 10 in FIGS. 1-7.

The sensor 10 comprises a base plate 11 of non-magnetic material such as aluminum, stainless steel, titanium, elgiloy or other appropriate material, and has a central opening 12 extending therethrough. Three radially projecting arms 13, 14 and 15 are spaced equidistantly around the circumference of the base plate for attaching the sensor to a mounting structure on a body whose motion is to be measured. Each arm has three uniformly spaced slotted openings 16, 17 and 18 therethrough, lying generally in planes radial to the center of the base plate, and dither drive coils 19 and 20 are mounted in slots 19a, 20a formed in that portion of the arms extending between the slotted openings 16-18 of each arm. As seen in FIG. 6, the coils 19 and 20 are oppositely wound so that their north and south poles are in opposed relationship to one another.

First and second rotors 30 and 31 of magnetic material are positioned on opposite sides of the base plate for counterrotating motion relative to one another about a dither axis "DA" lying on the longitudinal center axis of the base plate. Each rotor comprises a ring-shaped annulus 32 having three substantially equally spaced flux splitting raised portions 33, 34 and 35 on the surface opposite the base plate, and three equally spaced flexure mounting blocks and armature structures 34, 35 and 36 on the circumference thereof.

Each of the armature structures on rotor 30 has a single armature blade 37 projecting axially toward the base plate and into the center slotted opening 17 of a respective arm on the base plate, while each of the armature structures on rotor 31 has a pair of spaced apart armature blades 38 and 39 projecting axially toward the base plate and into the slotted openings 16 and 18 in a respective arm. Thus, the coil 19 is positioned between the armature blade 37 of rotor 30 and armature blade 38 on rotor 31, while the coil 20 is positioned between the armature blade 37 of rotor 30 and the other armature blade 39 of rotor 31. The torque coils are wound on magnetic cores and provide differential torque to the first and second rotors, as explained later hereinafter. They may be in series (28 v drive @<0.1 A) or parallel (±10 v drive @<0.3 A).

Rotor 30 also has three radially outwardly projecting accelerometer mounting arms 40, 41 and 42 thereon, spaced equidistantly around its circumference, and extending angularly toward the base plate and opposite rotor 31. Each mounting arm defines an accelerometer mounting surface 43 on which is secured an accelerometer 44.

Rotor 31 similarly has three radially outwardly projecting accelerometer mounting arms 45, 46 and 47 thereon, aligned with the arms on rotor 30, and offset toward the arms on rotor 30. Each mounting arm defines an accelerometer mounting surface 48 on which is secured an accelerometer 49.

Figure 2:
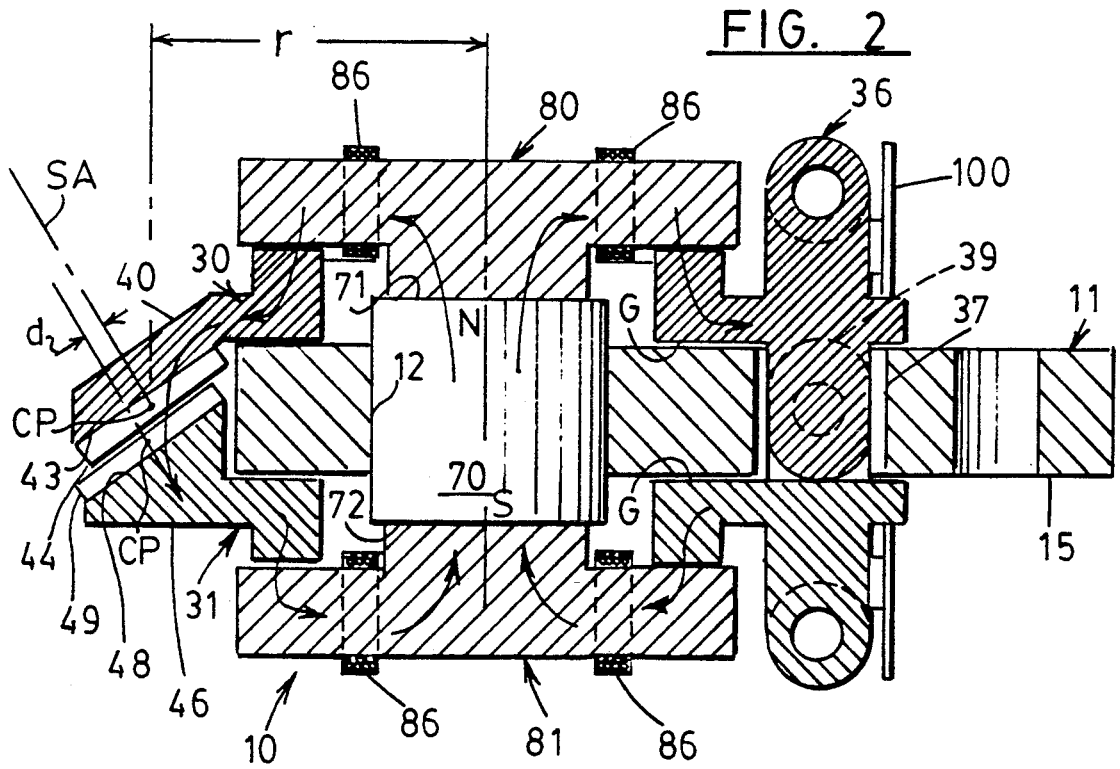
FIG. 2 is an enlarged transverse sectional view of the assembled base plate, rotors, magnet and pole pieces of the sensor of FIG. 1, taken along line 2—2 in FIG. 5.
Figure 5:
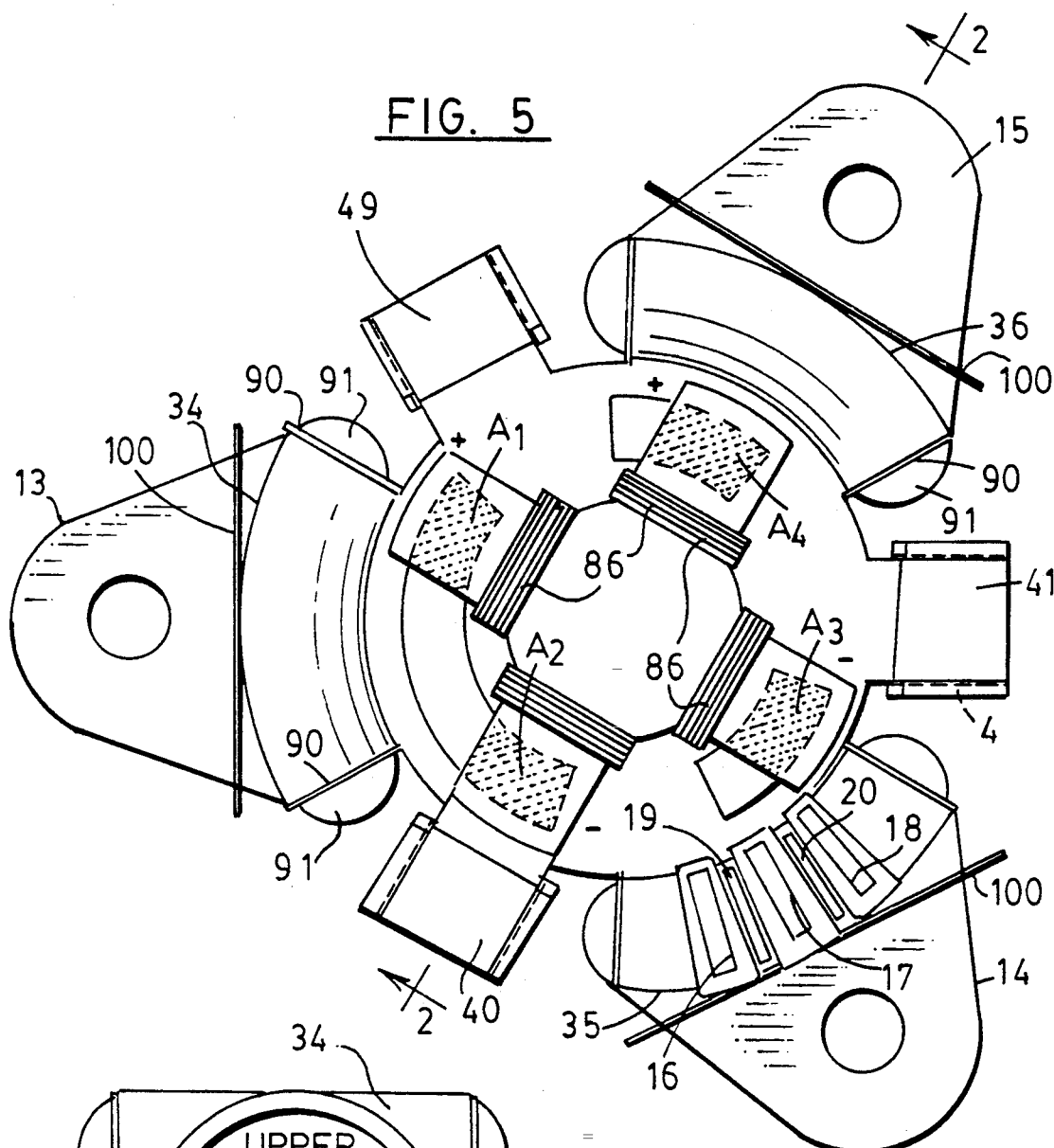
FIG. 5 is a somewhat diagrammatic plan view of the assembled structure of FIG. 1, showing some parts in elevation and some in section.
Figure 4:
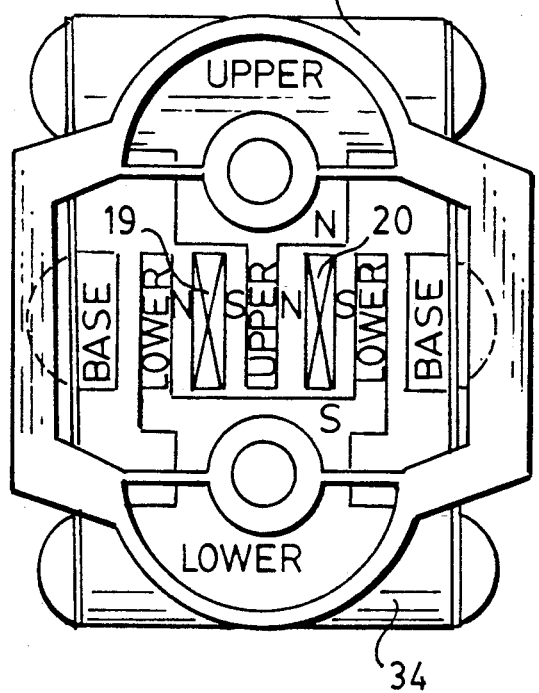
FIG. 4 is a somewhat diagrammatic side view of the assembled structure of FIG. 1, showing some parts in elevation and some in section.
Figure 11:
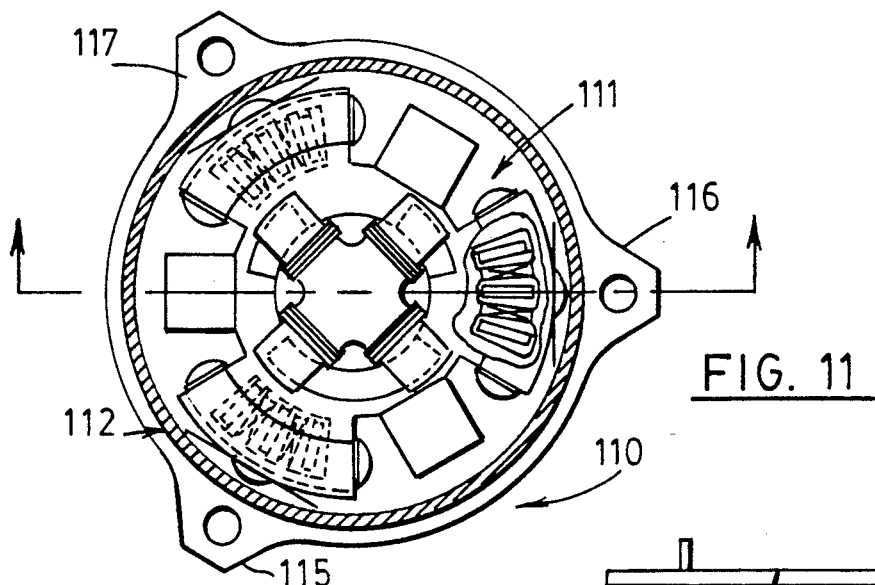
FIG. 11 is a diagrammatic transverse sectional view of the sensor of FIG. 8.
Figure 13:
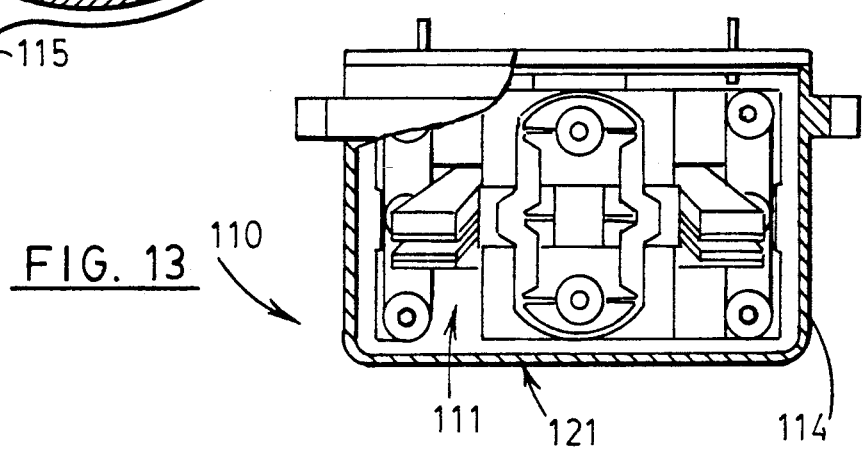
FIG. 13 is a side view shown partly in section of the sensor of FIG. 8.
Figure 12:
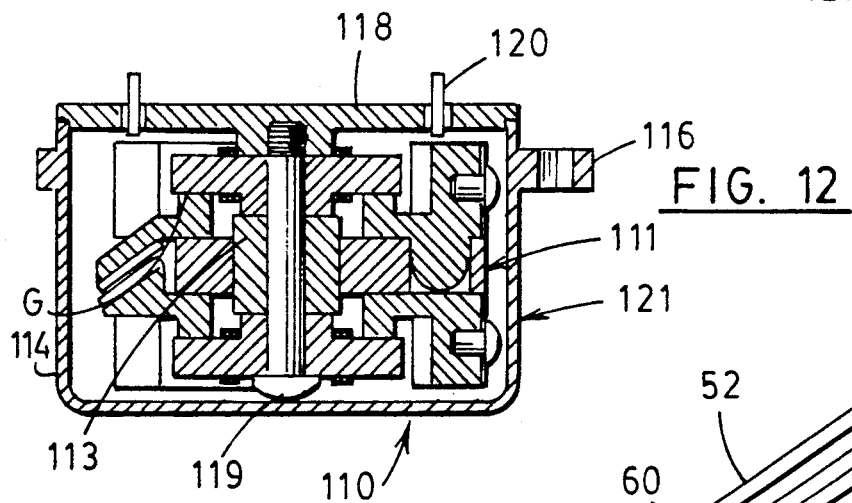
FIG. 12 is a longitudinal sectional view taken along the line 12—12 in FIG. 11.

As seen best in FIGS. 1 and 2, the accelerometers 44 and 49 define accelerometer pairs, and the arms 40-42 and 45-47 are configured so that the accelerometers of the respective pairs are positioned in parallel, juxtaposed relationship to one another with their centers of percussion CP nearly coincident. As seen in FIG. 2, for instance, the centers of percussion CP of the two accelerometers 44 and 49 comprising an accelerometer pair are at the same radius "r" from the dither axis DA, and their sensitive axes are spaced apart a very small distance "d". As indicated, the sensitive axes SA of the accelerometers 44 and 49 are parallel but point in opposite directions, so that common mode error signals are canceled.

Figure 14:
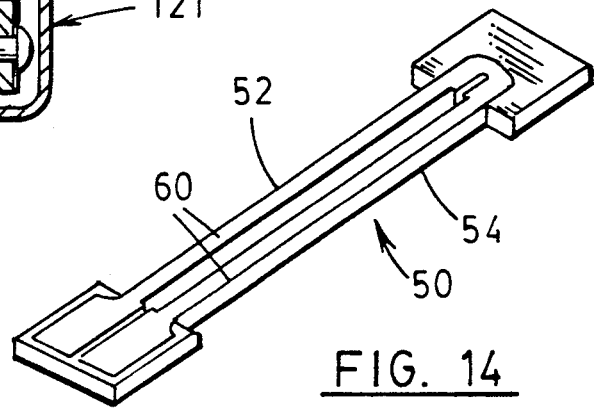
FIG. 14 is a perspective view of one type of vibrating beam accelerometer or force transducer element that may be used in the present invention.

The accelerometers may be of any suitable low profile design, including those described in applicant's earlier U.S. Pat. No. 4,881,408 and application Ser. No. 316,299, filed Feb. 27, 1989. U.S. Pat. No. 4,912,990, in particular, discloses an especially suitable force transducer for use in the present invention. With reference to FIG. 2 of that patent, or FIG. 14 herein, the transducer includes a body 50 having opposed beams 52 and 54 with an electrically conductive trace 60 thereon. Vibrating beam accelerometers, and especially those micromachined from a silicon wafer, have low internal damping to achieve high Q values that result in low drive power requirements, are low in self-heating, and insensitive to electronic component variations.

The accelerometers are mounted with their sensitive axes "SA" perpendicular to the direction DM of dither motion (see FIG. 1) and perpendicular, respectively, to three orthogonal prime axes "X", "Y" and "Z" relative to which angular rate and linear acceleration are to be measured. In the specific example illustrated, the sensitive axis of each accelerometer subtends an angle of 35.26° relative to the dither axis "DA".

A permanent magnet 70 is fixed in the central opening 12 of the base plate, and has one pole 71 (North, for example) projecting beyond said one side of the base plate, and the opposite pole 72 (South, for example) projecting beyond the opposite side of the base plate. A pair of cross- or X-shaped pole pieces 80 and 81 of magnetic material are mounted on respective opposite poles 71 and 72 of the magnet, and each has four arms 82, 83, 84 and 85 extending radially outwardly over the adjacent rotors. These arms extend over the flux splitting raised portions 33, 34 and 35 on the respective rotors, defining overlapped areas $A_1$, $A_2$, $A_3$ and $A_4$ between the arms and raised portions, and spaced apart by a gap G. The magnet is preferably an AlNiCo type magnet capable of achieving an 8K gauss field strength. Assuming that the cross-sectional area across each gap is preserved, the resulting field intensity would be approximately:

2K gauss in the coil gap; 1K gauss in the accelerometer area; and 2K gauss in the gap with each arm of the rotor.

Velocity sensing pick-off coils 19, 20 are wound on each rotor at the inner ends of the arms. These coils are perfectly matched to one another to prevent uneven interaction with the lines of flux produced by the magnet. The total magnetic flux of the magnet is split into four roughly equal parts by the arms of the pole piece 80 and recombined in the rotor. It is then split roughly 2:1 between the coils 19, 20 and accelerometers 44, 49. The flux is recombined in the rotor 31 and again split into four roughly equal parts by the arms of the pole piece 81, and then returned to the magnet.

The rotors are held in operative relationship to the assembly by a plurality of flexures 90 (only one of which is shown in FIG. 3 for purposes of clarity) that are secured with fasteners 91 at their opposite ends to the flexure mounting blocks on the respective rotors, and intermediate their ends to a side portion of each arm on the base plate, such that they each lie in a plane radial to the dither axis. In the specific structure illustrated, two such flexures are secured on each mounting block and associated base plate mounting arm, whereby a total of six such flexures are provided. These flexures provide a natural frequency that is near the drive frequency of the dither drive, and define the magnetic gaps and spacing between the armatures and dither drive coils 19 and 20. They also ensure that the rotors move only in the dither directions and prevent axial displacement of the rotors.

A link 100 is also secured at its opposite ends to each flexure mounting arm on the respective rotors (only one is shown in FIG. 3 for purposes of clarity) to cause the rotors to have equal and opposite motion relative to one another. Reference may be made to commonly owned U.S. Pat. No. 4,821,572 for description of a comparable link (56).

Differential torque is applied to the rotors to effect the dithering motion of them by the interaction of the coils 19 and 20 with the armatures 37, 38 and 39. For instance, and referring particularly to FIGS. 2–7, it can be seen that the coils 19 and 20 are disposed with their north pole N and south pole S in opposed relationship to one another. The armatures 38 and 39 on rotor 31 carry a south polarity and the armatures 37 on rotor 30 carry a north polarity because of the association of the respective rotors with the north and south poles of the magnet 50. Thus, when a sinusoidally alternating electric current is sent through the coils, armature 38 will first be attracted to coil 19 while armature 39 is simultaneously repelled by coil 20, and armature 37 will be simultaneously attracted to coil 19 and repelled by coil 20 during a first half cycle of the energizing current. During the next half cycle, armature 38 will be repelled by coil 19 while armature 39 is simultaneously attracted by coil 20, and armature 37 will be simultaneously repelled by coil 19 and attracted to coil 20.

In operation, the rotors 30 and 31 and associated accelerometers 44 and 49 are oscillated or dithered at a frequency of, for example, 150 Hz at a peak displacement or amplitude of about 8 millinches with a radius from the dither axis to the center of percussion of the accelerometers of 0.5 inch. This provides an acceleration proportional to angular rotation of:

$$a = 8\Omega df = \frac{8 \times (8 \times 10^{-3}) \text{ in} \times 150 \text{Hz}}{386.1 \text{ in/sec}^2} \Omega \text{ rad/sec.}$$

or a scale factor of $a(g's) = 25 \times 10^{-3}$ (g's)/rad/sec. Principal advantages, among others, of this design are that: (1) the accelerometers are in close proximity to one another, which minimizes the noise induced effect of angular acceleration on rate (with accelerometers micromachined from a silicon wafer, the moment arm is only 20 mils—the thickness of the wafer); (2) one magnet supplies flux to: (a) the six accelerometers (when they are magnetically driven); (b) the dither drive or torque coil pairs; and (c) to the eight angular velocity sensing coils; (3) the structure is very compact, being only 1.25 inch in diameter and 0.8 inch high, with a total volume of about one cubic inch; and (4) the performance is limited only by accelerometer performance, i.e., for a 40 g range vibrating beam accelerometer, gyro performance can be on the order of 1°/hour and 0.1°/√Hr. Scaling down from the prior art (8 cubic inches in a similar prior art device (U.S. Pat. No. 4,821,572) to 1 cubic inch for the present invention) does not adversely affect performance since the radius of rotation "r" (0.5 inch) is the same.

MODIFICATION

A variation of the sensor shown in FIGS. 1–7 is represented at 110 in FIGS. 8–13. In this form of the invention, a sensor assembly 111 similar to that shown in FIGS. 1–5 is enclosed within a dust-proof housing 112. The assembly is essentially the same as that previously illustrated and described, except that the base plate 113 does not have the radially projecting arms 13, 14 and 15 of the first form of the invention for attachment of the sensor to a mounting structure. Instead, the cover 114 has a plurality of radially protruding ears 115, 116 and 117 for attaching the device to a body whose motion is to be measured. The assembly 111 is secured to end wall 118 of the housing by means of an elongate fastener 119 extended through the assembly coincident with the dither axis and into a threaded opening in the end wall.

Electrical connections 120 for connecting the sensor to suitable signal processing circuitry is also provided in the end wall 118. In all other respects this form of the invention is constructed the same and functions the same as that previously described.

In the present invention, six micromachined linear accelerometers, a low cost DC torque motor, a low cost angular velocity sensor and a unique miniature mechanism are combined to provide a very compact (1 cubic inch), high performance (1°/hr, 1 mg) and low cost inertial measurement unit. The sensor of the invention provides a digital output for three axes of rotation and three axes of linear acceleration, which can be compensated for temperature, to interface with a host computer to measure changes in acceleration and angular rate. The arrangement of the single magnet, the rotors with integral armatures, placement of pole pieces, pick-off coils and torque coils result in a structure having a minimum number of parts and provides ease of construction and assembly. Moreover, the drive for the dithering motion is reactionless, and entails no bearings, flexing drive or pick-off wires or other use of components subject to wear.

A significant improvement of the present invention over prior art devices is the reduction in the offset or distance "d" between the centers of percussion and sensitive axes of the accelerometers in the accelerometer pairs (from approximately 0.30 inch for the closest prior art device to 0.01 inch in the present invention). This results in a reduction of 30:1 in angular sensitivity. In addition, the dither drive of the present invention is simple and effective, and eliminates moving magnets and/or coils with the concomitant flexing of wires that are present in some prior art devices. Further, a single magnet is used in the present invention to provide flux for the dither drive, the pick-off coils and the accelerometers; and, the unique pole pieces and flux splitting protrusions cooperate to provide differential flux splitting, in quadrature, which minimizes scale factor modulations of the torque coils to the velocity sensing coils.

While the invention has been shown and described in detail, it is obvious that this invention is not to be considered as being limited to the exact form disclosed, and that changes in detail and construction may be made therein within the scope of the invention, without departing from the spirit thereof.

What is claimed is:

1. A sensor for measuring angular rate and linear acceleration of a body on which the sensor is mounted, comprising:
   rotor means mounted on a base plate for oscillating dithering motion about a dither axis extending through the base plate;
   accelerometer means carried by the rotor means and having a sensitive axis that is perpendicular to the direction of dither motion and perpendicular to a prime axis relative to which angular rate is to be measured;
   electromagnet dither drive means operatively associated with the rotor means for effecting the dithering motion of the rotor means;
   velocity sensing pick-off coil means operatively associated with the rotor means for providing a signal representative of the angular velocity about the dither axis; and
   single permanent magnet means carried by the base plate for providing a flux field to interact with the electromagnet dither drive means to provide the electromotive force for effecting the dithering motion of the rotor means, and to provide lines of flux which are cut by the velocity sensing pick-off coil means for producing the velocity sensing signal.

2. A sensor as claimed in claim 1, wherein:
   the rotor means comprises first and second rotors mounted for counter-rotating dithering motion on opposite sides of the base plate; and
   a plurality of accelerometers are carried by each rotor, the accelerometers on one rotor being in aligned juxtaposition with the accelerometers on the other rotor and defining a plurality of accelerometer pairs with one accelerometer in each pair having its sensitive axis pointing in one direction parallel to a prime axis relative to which motion is to be sensed, and the other accelerometer in each pair having its sensitive axis pointing in a parallel but opposite direction, whereby the accelerometers in a pair will produce equal but opposite signals that may be processed to eliminate common mode error signals 3. A sensor as claimed in claim 2, wherein:
   the accelerometers comprise vibrating beam accelerometers having opposed, closely adjacent, elongate beams with current conducting means thereon; and
   the single magnet means provides lines of flux for interaction with the current conducting means on the accelerometer beams to provide an electromotive force to vibrate the beams of the accelerometer.

4. A sensor as claimed in claim 2, wherein:
   the single magnet means comprises a single magnet carried by the base plate and having one pole disposed on one side of the base plate adjacent a first rotor, and another pole disposed on the other side of the base plate adjacent the second rotor;
   a pole piece is mounted at each pole of the magnet, each pole piece having a plurality of arms projecting radially outwardly over the adjacent rotor for distributing flux from the magnet to one rotor and for collecting flux from the other rotor and returning the flux to the magnet; and
   said velocity sensing pick-off coil means comprises a coil disposed on each arm.

5. A sensor as claimed in claim 4, wherein:
   the rotors have flux splitting protrusions thereon extending into close proximity with the respective pole pieces, the flux splitting protrusions being oriented with respect to the arms of the pole pieces so that differential flux splitting is obtained between the two rotors and their associated pole pieces.

6. A sensor as claimed in claim 4, wherein:
   a flux splitting protrusion is formed on each rotor for underlying relationship with each arm of the adjacent pole piece, the extent of flux conducted through each protrusion being dependent upon the extent of overlap of the area of that protrusion with the associated arm, and at least one of the protrusions on each rotor being arranged so that the extent of overlap decreases as the rotor rotates in a first direction, while the extent of overlap of the remaining protrusion increases.

7. A sensor as claimed in claim 4, wherein:
   each pole piece has four radially extending arms, with each arm subtending an angle of 90° with respect to the adjacent arms, defining an X-shaped configuration; and a flux splitting protrusion is associated with each arm, two of the protrusions being arranged so that the extent of overlap of them with their associated arms decreases as the rotor rotates in a first direction, while the extent of overlap of the two remaining protrusions increases.

8. A sensor as claimed in claim 2, wherein:

at least one pair of first and second electromagnetic coils are carried by the base plate in adjacent relationship to one another, said coils having opposed north and south poles;

armature means on the rotors extending into proximity with the electromagnetic coils so that when the coils are energized the armature means is attracted to one coil and repelled from the other; and circuit means connected with the coils to cyclically energize the coils so that the armature means is first attracted to said first coil and repelled from the second, and then attracted to the second coil and repelled from the first to effect an oscillating dithering motion of the rotor means.

9. A sensor as claimed in claim 8, wherein:

the electromagnetic coils are mounted in spaced apart slots formed in radially projecting arms of the base plate, with the slots lying in planes radial to the center of the base plate; and the armature means on the rotors comprise axially projecting armature blades extending into slots formed in the base plate in side-by-side relationship with the slots that receive the electromagnetic coils, said armature blades being positioned relative to the electromagnetic coils so that the rotors are caused to rotate in opposite directions upon energization of the electromagnetic coils.

10. A sensor as claimed in claim 9, wherein:

the single magnet means comprises a single magnet carried by the base plate and having one pole disposed on one side of the base plate adjacent a first rotor, and another pole disposed on the other side of the base plate adjacent the second rotor;

a pole piece is mounted at each pole of the magnet, each pole piece having a plurality of arms projecting radially outwardly over the adjacent rotor for distributing flux from the magnet to one rotor and for collecting flux from the other rotor and returning the flux to the magnet; and said velocity sensing pick-off coil means comprises a coil disposed on each arm.

11. A sensor as claimed in claim 10, wherein:

a flux splitting protrusion is formed on each rotor for underlying relationship with each arm of the adjacent pole piece, the extent of flux conducted through each protrusion being dependent upon the extent of overlap of the area of that protrusion with the associated arm, and at least one of the protrusions on each rotor being arranged so that the extent of overlap decreases as the rotor rotates in a first direction, while the extent of overlap of the remaining protrusion increases.

12. A sensor as claimed in claim 2, wherein:

each rotor has a plurality of radially projecting arms thereon, with the arms on each rotor being displaced toward the arms of the other rotor so that the arms include free end portions spaced closely together, said free end portions on adjacent arms defining accelerometer mounting surfaces that are parallel to one another; and said accelerometer means comprise an accelerometer mounted on each mounting surface so that a plurality of accelerometer paris are defined, with the accelerometers each having a sensitive axis perpendicular to the direction of dither motion and perpendicular to a prime axis relative to which angular rate is to be measured, the accelerometers on one rotor having their sensitive axis pointing in one direction perpendicular to the respective prime axis, and the adjacent, paired accelerometers on the other rotor having their sensitive axis pointing in a parallel but opposite direction.

13. In a sensor for measuring angular rate and linear acceleration of a body on which the sensor is mounted, said sensor including first and second rotors carried on opposite sides of a base plate for counter-rotating dithering motion about a dither axis extending through the base plate, dither drive means for dithering the rotors, accelerometer means carried by the rotors for sensing angular rate and linear acceleration and producing a signal in response thereto, velocity sensing pick-off coils associated with the rotors for detecting angular motion of the rotors and producing a signal in response thereto, and signal processing means for processing the signals to obtain a measure of the angular rate and linear acceleration, the improvement comprising:

permanent magnet means carried by the base plate and having one pole disposed adjacent one rotor and the other pole disposed adjacent the other rotor;

a pole piece mounted at each pole of the magnet means, each said pole piece having a plurality of arms projecting radially outwardly over the adjacent rotor, and on each of which a velocity sensing coil is mounted; and said rotors having flux splitting means thereon for cooperation with the arms and associated coils on the pole pieces so that differential flux splitting is obtained as the rotors are dithered with respect to the pole pieces.

14. A sensor as claimed in claim 13, wherein:

the pole pieces each have four arms, with the arms of one rotor being in vertically aligned, parallel relationship to the arms of the other rotor, and the arms of each rotor being circumferentially spaced 90° from the adjacent arms of that rotor, whereby the coils work in series opposed pairs and the quadrature arrangement of the arms and associated coils minimize scale factor modulation of the dither drive means to the velocity sensing coils.

15. A sensor as claimed in claim 13, wherein:

the dither drive means comprises at least one pair of first and second electromagnetic coils carried by the base plate in adjacent relationship to one another, said coils having opposed north and south poles;

armature means on the rotors extending into proximity with the electromagnetic coils so that when the coils are energized the armature means is attracted to one coil and repelled from the other; and circuit means connected with the coils to cyclically energize the coils so that the armature means is first attracted to said first coil and repelled from the second, and then attracted to the second coil and repelled from the first to effect an oscillating dithering motion of the rotor means.

16. A sensor as claimed in claim 15, wherein:

the electromagnetic coils are mounted in spaced apart slots formed in radially projecting arms of the base plate, with the slots lying in planes radial to the center of the base plate; and the armature means on the rotors comprise axially projecting armature blades extending into slots formed in the arms of the base plate in side-by-side relationship with the slots that receive the electromagnetic coils, said armature blades being positioned relative to the electromagnetic coils so that the rotors are caused to rotate in opposite directions upon energization of the electromagnetic coils.

17. A sensor as claimed in claim 13, wherein:

each rotor has a plurality of radially projecting arms thereon, with the arms on each rotor being displaced toward the arms of the other rotor so that the arms include free end portions spaced closely together, said free end portions on adjacent arms defining accelerometer mounting surfaces that are parallel to one another; and said accelerometer means comprises an accelerometer mounted on each mounting surface so that a plurality of accelerometer pairs are defined, with the accelerometers each having a sensitive axis perpendicular to the direction of dither motion and perpendicular to a prime axis relative to which angular rate is to be measured, the accelerometers on one rotor having their sensitive axis pointing in one direction perpendicular to the respective prime axis, and the adjacent, paired accelerometers on the other rotor having their sensitive axis pointing in a parallel but opposite direction.

18. A sensor as claimed in claim 14, wherein:

the dither drive means comprises at least one pair of first and second electromagnetic coils carried by the base plate in adjacent relationship to another, said coils having opposed north and south poles;

armature means on the rotors extending into proximity with the electromagnetic coils so that when the coils are energized the armature means is attracted to one coil and repelled from the other; and circuit means connected with the coils to cyclically energize the coils so that the armature means is first attracted to said first coil and repelled from the second, and then attracted to the second coil and repelled from the first to effect an oscillating dithering motion of the rotor means.

19. A sensor as claimed in claim 18, wherein:

the electromagnetic coils are mounted in spaced apart slots formed in radially projecting arms of the base plate, with the slots lying in planes radial to the center of the base plate; and the armature means on the rotors comprise axially projecting armature blades extending into slots formed in the arms of the base plate in side-by-side relationship with the slots that receive the electromagnetic coils, said armature blades being positioned relative to the electromagnetic coils so that the rotors are caused to rotate in opposite directions upon energization of the electromagnetic coils.

* * * * *